UNITED STATES PATENT OFFICE.

ALFRED RANGOD PECHINEY, OF SALINDRES, FRANCE, ASSIGNOR TO COMPAGNIE DES PRODUITS CHIMIQUES D'ALAIS ET DE LA CAMARGUE, OF LYON, FRANCE.

CALCINATION OF HYDRATED ALUMINA.

No. 811,433.   Specification of Letters Patent.   Patented Jan. 30, 1906.

Application filed April 3, 1905. Serial No. 253,580.

*To all whom it may concern:*

Be it known that I, ALFRED RANGOD PECHINEY, residing at Salindres, Department of Gard, in the Republic of France, have invented Improvements in the Calcination of Hydrated Alumina, of which the following is a specification.

For certain uses alumina requires to be dehydrated by calcination as completely as possible, notably when it is to serve for the manufacture of aluminium by the electrometallurgical processes at present in use. To attain complete dehydration, a very high temperature is required at the final period of the calcination. Moreover, if the material does not remain exposed during a sufficient period of time to this very high temperature it has after it cools down again an inconvenient aptitude of partially rehydrating itself under the sole influence of atmospheric moisture. These difficulties which the complete dehydration of alumina offers are considerably lessened when there is incorporated with the alumina to be calcined a small predetermined quantity of a fluorid. The presence of the fluorin produces in a very decided manner the following advantages or results: First, the final temperature of the calcination may be considerably less than heretofore usual without interference with the perfect calcination; second, the exposure of the material to the high final temperature does not need to be prolongated for rendering the product after calcination not liable to become rehydrated by exposure to the atmosphere; third, finally at about 1,200° centigrade the material in the furnace becomes suddenly agglomerated in coherent masses.

The improvements which form the object of the present invention are based upon the preceding observations. According to this invention a convenient fluorid is incorporated with the alumina which it is desired to calcine. This incorporation may be simply done by sprinkling and mixing the product to be calcined with dilute hydrofluoric acid or with a dilute solution of aluminium fluorid. The proportion of fluorin necessary is very small. For example, 0.25 of one part of fluorin to one hundred parts of anhydrous alumina yields quite appreciable results. Its augmentation up to one part of fluorin to one hundred parts of anhydrous alumina is, however, to be recommended, as this gives the best results both as to cost and the perfection of the calcination. With this quantity (one per cent.) of fluorin the agglomeration of the final anhydrous alumina attains very nearly the maximum possible density. Hydrofluoric acid and fluorid of aluminium should be employed in preference to all other fluorids, as hydrofluoric acid and fluorid of aluminium cannot introduce into the alumina any impurity other than traces of fluorin, which, however, is volatilized during the calcination in a manner sometimes so complete that it is exceedingly difficult to discover traces in the calcined alumina.

To carry out the process in practice, a solution of fluorid of aluminium of, say, from 12° to 14° Baumé may be employed and this solution mixed with the hydrate of alumina to be calcined, the one being added to the other in quantities such that the mixture may contain very nearly one part of fluorin to one hundred parts of anhydrous alumina. These indications are only given by way of example, and it is to be understood that it is not desired to restrict or limit the carrying out of the invention. After mixture the material is calcined in an appropriate furnace. The agglomerated lumps or pieces are after cooling reduced by crushing or grinding, if required, to the state of division which best suits the use for which the anhydrous alumina is intended. When it is proposed to obtain the anhydrous alumina agglomerated in the form of bricks, slabs, or the like capable of being used, say, for furnace-linings, as they are very refractory, the calcination of the hydrated alumina admixed with a fluorid should be carried out by preference in appropriate molds.

What I claim is—

1. The improved process of calcinating hydrated alumina, according to which such hydrated alumina is calcined in the presence of a fluorid at a temperature of 1,200° centigrade, or thereabout, substantially as set forth for the purpose specified.

2. The improved process of calcining hydrated alumina, according to which such hydrated alumina is calcined in the presence of a fluorid volatile at the temperature to which the calcination is effected, substantially as set forth for the purpose specified.

3. The improved process of calcining hydrated alumina, according to which such hydrated alumina is calcined in the presence of fluorid of aluminium, substantially as set forth for the purpose specified.

4. The improved process of calcining hydrated alumina, according to which such hydrated alumina is calcined in the presence of a fluorid, the mixture containing approximately one part of fluorin to one hundred parts of anhydrous alumina, substantially as set forth for the purpose specified.

5. In the calcination of hydrated alumina, mixing a solution of fluorid of aluminium with the hydrate of alumina to be calcined, so that the mixture contains say one part of fluorin to one hundred parts of anhydrous alumina.

In testimony whereof I have signed my name to this specification in the presence of two subscribing witnesses.

ALFRED RANGOD PECHINEY.

Witnesses:
   HENRI CARTIER,
   AUGUSTUS JEANS.